(12) United States Patent
Brown et al.

(10) Patent No.: US 7,175,789 B2
(45) Date of Patent: *Feb. 13, 2007

(54) INJECTION MOLDING UTILIZING BASE-WALL-SECTION FLOW GUIDES

(75) Inventors: Paul Philip Brown, Ramona, CA (US); Jens Ole Sorensen, Rancho Santa Fe, CA (US)

(73) Assignee: Sorensen Research and Development Trust, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/030,922

(22) Filed: Jan. 7, 2005

(65) Prior Publication Data

US 2005/0156354 A1   Jul. 21, 2005

Related U.S. Application Data

(62) Division of application No. 10/050,434, filed on Jan. 15, 2002, now Pat. No. 6,841,104.

(51) Int. Cl.
*B29C 45/37* (2006.01)
*B29C 45/80* (2006.01)

(52) U.S. Cl. ............. 264/40.5; 264/328.7; 264/328.12; 425/150

(58) Field of Classification Search ............... 264/40.5, 264/328.7, 328.12, 328.15; 425/542, 577, 425/150; 220/608, 609; 215/374, 375, 373, 215/382

See application file for complete search history.

(56) References Cited

U.S. PATENT DOCUMENTS 3,375,554 A   4/1968   Blumer (Continued)

FOREIGN PATENT DOCUMENTS

DK  117387  9/1970
EP  0 347 837 A2  12/1989

*Primary Examiner*—Jill L. Heitbrink
(74) *Attorney, Agent, or Firm*—Edward W. Callan

(57) ABSTRACT

During injection molding of a plastic product having a base wall and a sidewall, alignment of the mold parts that shape the mold cavity is maintained by conducting injected plastic material through a sequence of variable-opening throttles in a base-wall-section flow guide of the mold cavity. The openings of the throttles vary in response to variations in the thickness of a region of the sidewall section into which injected plastic material is conducted from the base-wall-section flow guide so that upon an increase in the thickness of such region the openings of the throttles in the base-wall-section flow guide decrease and so that upon a decrease in the thickness of such region the openings of the throttles in the base-wall-section flow guide increase.

10 Claims, 6 Drawing Sheets

U.S. PATENT DOCUMENTS

| | | |
|---|---|---|
| 3,397,266 A | 8/1968 | Ayres |
| 3,737,272 A * | 6/1973 | Segmuller .................. 425/595 |
| 3,829,548 A | 8/1974 | Edwards |
| 3,882,212 A | 5/1975 | Edwards |
| 3,995,008 A | 11/1976 | Spiegelberg |
| 4,264,295 A | 4/1981 | Hingley |
| 4,332,545 A | 6/1982 | Cargile |
| 4,467,994 A | 8/1984 | Sorensen |
| 4,657,141 A | 4/1987 | Sorensen |
| 4,935,188 A * | 6/1990 | Sorensen ................. 264/328.7 |
| 4,956,143 A | 9/1990 | McFarlane |
| 4,959,005 A | 9/1990 | Sorensen |
| 4,960,557 A * | 10/1990 | Sorensen ............... 264/328.12 |
| RE33,608 E | 6/1991 | Sorensen |
| 5,174,941 A * | 12/1992 | Sorensen .................... 264/250 |
| 5,639,487 A | 6/1997 | Wurst et al. |
| 5,833,913 A * | 11/1998 | Ellwood et al. ......... 264/328.7 |
| 5,972,256 A | 10/1999 | Wurst et al. |
| 6,841,104 B2 * | 1/2005 | Brown et al. .............. 264/40.5 |
| 6,936,213 B1 * | 8/2005 | Brown .................... 264/328.1 |

\* cited by examiner

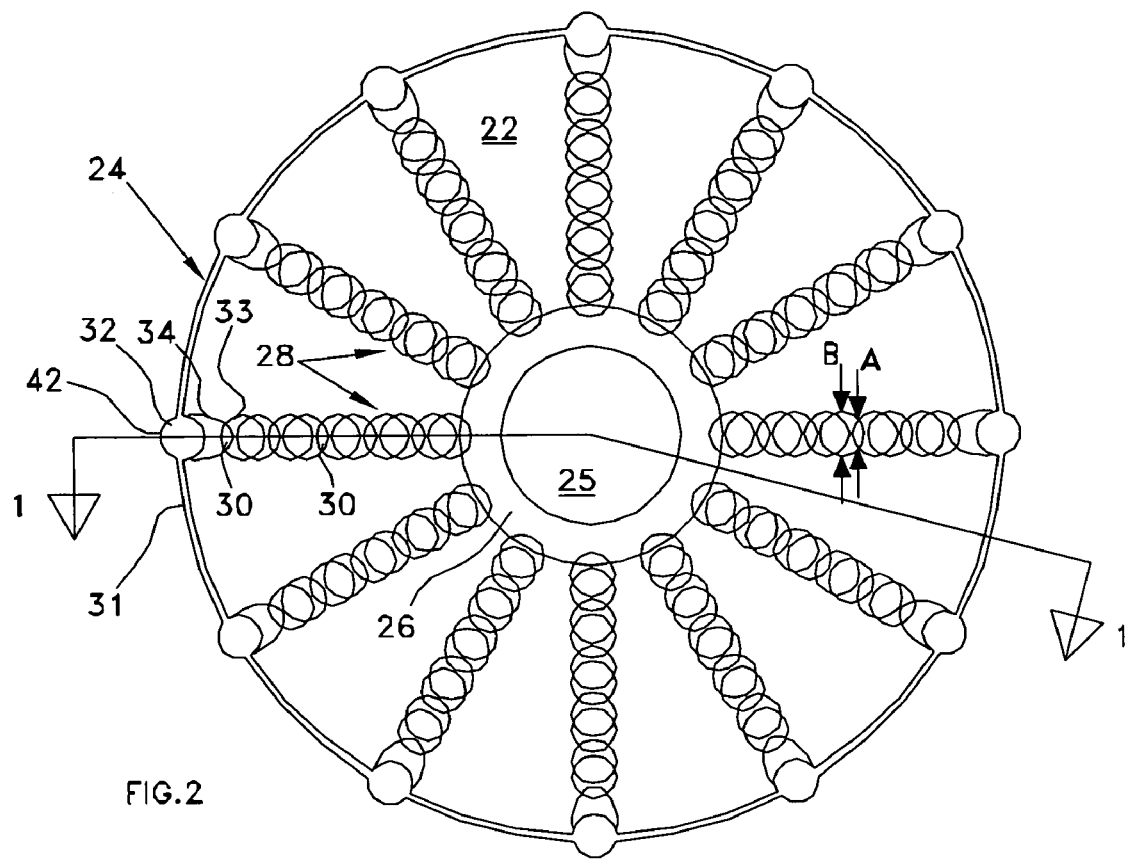
FIG.2
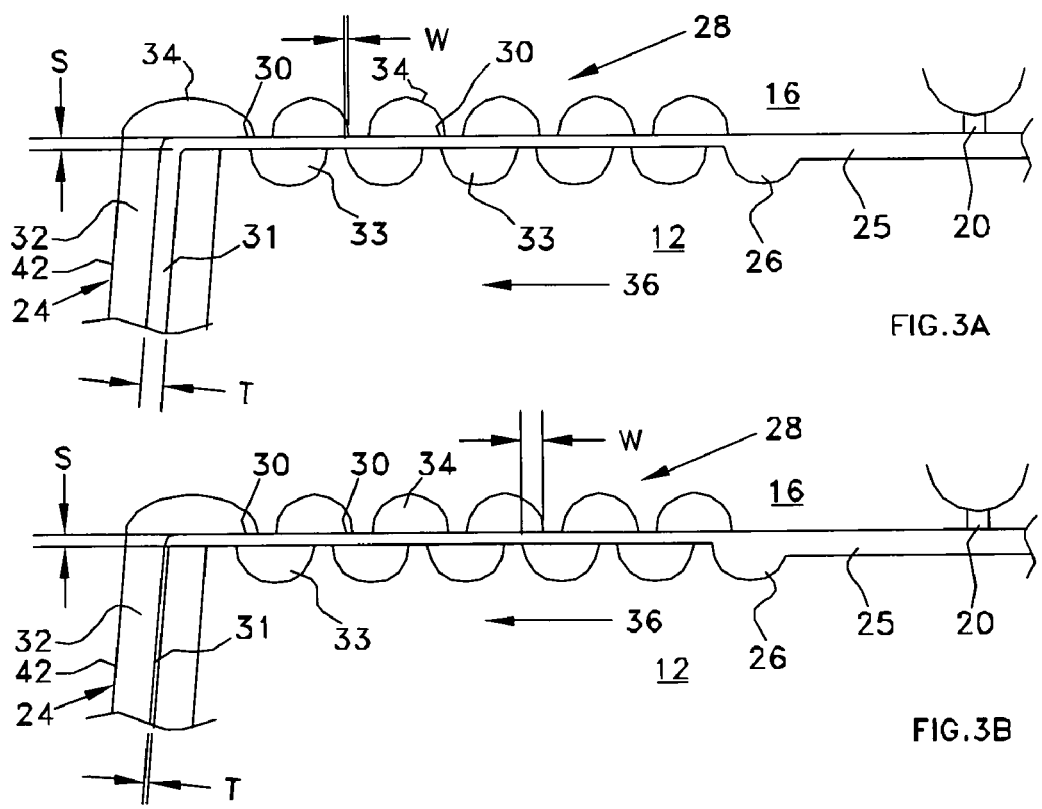
FIG.3A
FIG.3B

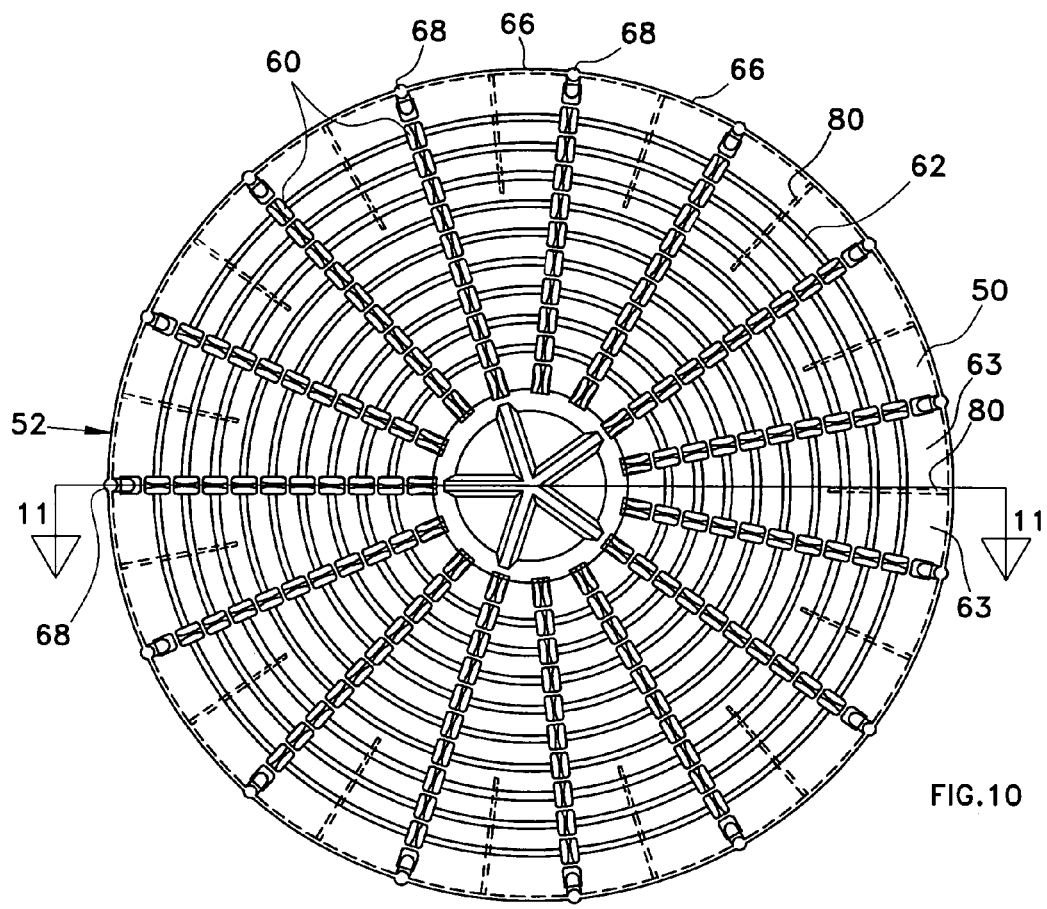
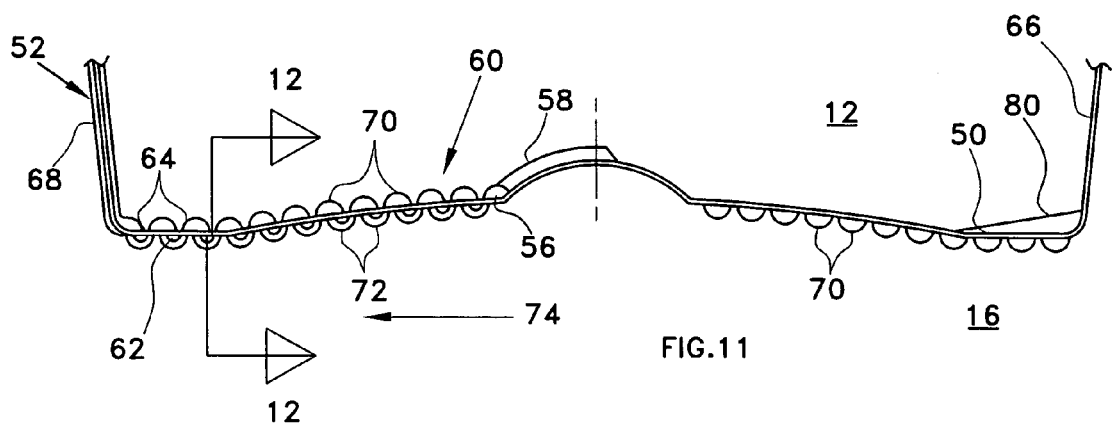
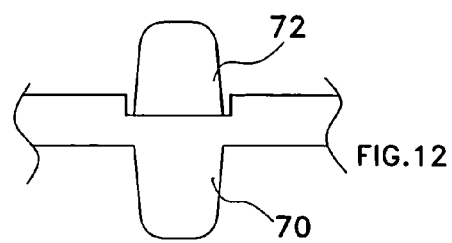
FIG.10
FIG.11
FIG.12

INJECTION MOLDING UTILIZING BASE-WALL-SECTION FLOW GUIDES

CROSS REFERENCE TO RELATED APPLICATION

This is a division of co-pending application Ser. No. 10/050,434, filed Jan. 15, 2002, which is scheduled to issue Jan. 11, 2005 as U.S. Pat. No. 6,841,104.

BACKGROUND OF THE INVENTION

The present invention generally pertains to injection molding of plastic products and is particularly directed to conducting the flow of injected plastic material by utilizing flow guides within the base-wall section of the mold cavity during injection molding of a plastic product having a base wall and a sidewall.

Various methods and apparatus for adjusting flow of injected plastic material and/or maintaining such an alignment by steering at least one of the mold parts during injection of fluid plastic material are described in U.S. Pat. No. 3,375,554 to Blumer, U.S. Pat. No. 3,397,266 to Ayres, U.S. Pat. No. 3,829,548 to Edwards, U.S. Pat. No. 3,882,212 to Edwards, U.S. Pat. No. 3,995,008 to Spiegelberg, U.S. Pat. No. 4,264,295 to Hingley, U.S. Pat. No. 4,467,994 to Sorensen and U.S. Pat. No. 4,657,141 to Sorensen, U.S. Pat. No. 4,959,005 to Sorensen, and European Patent Publication No. 0 347 837 A2.

SUMMARY OF THE INVENTION

The present invention provides a method of injection molding a plastic product having a base wall and a sidewall, the method comprising the steps of:

(a) injecting fluid plastic material into a base-wall section of a mold cavity wherein the base-wall section includes at least one flow guide that is defined by a first mold part, a second mold part, and a third mold part that is movable relative to the first and second mold parts to either decrease or increase the conduction of injected plastic material through said at least one flow guide;

(b) conducting said injected plastic material through said at least one flow guide in the base-wall section and thence into a sidewall section of the mold cavity; and (c) while said injected plastic material is being conducted into the sidewall section of the mold cavity, adjusting said conduction within the at-least-one base-wall section flow guide by moving the movable third mold part to decrease and/or increase said conduction of said plastic material within said flow guide;

wherein step (c) comprises moving the movable third mold part dynamically in response to sensed variations in injection pressures in different portions of the sidewall section of the mold cavity.

For the purpose of interpreting this document, a flow guide is a portion of a mold cavity that conducts plastic material into an adjacent thinner portion of the mold cavity and/or into another flow guide.

In another aspect, the present invention provides a method of injection molding a plastic product having a base wall and a sidewall, the method comprising the steps of:

(a) injecting fluid plastic material into a base-wall section of a mold cavity wherein the base-wall section includes at least one flow guide that is defined by a first mold part, a second mold part, and a third mold part that is movable relative to the first and second mold parts to either decrease or increase the conduction of injected plastic material through said at least one flow guide; and (b) conducting said injecting plastic material through said at least one flow guide in the base-wall section and thence into a sidewall section of the cavity;

wherein step (b) comprises the step of:

(c) conducting said injected plastic material through a sequence of variable-opening throttles in a given said at-least-one base-wall-section flow guide, wherein the opening of said throttles can vary in response to variations in the thickness of a region of the sidewall section into which injected plastic material is conducted from the given flow guide so that upon an increase in the thickness of said region the openings of said throttles in the given flow guide decrease and so that upon a decrease in the thickness of said region the opening of said throttles in the given flow guide increase;

the method further comprising the step of:

(d) while said injected plastic material is being conducted into the sidewall section of the mold cavity, adjusting said conduction within the at-least-one base-wall section flow guide by moving the movable third mold part to decrease and/or increase said conduction of said plastic material within said flow guide;

wherein step (d) comprises moving the movable third mold part dynamically in response to sensed variations in injection pressures in different portions of the sidewall section of the mold cavity.

The present invention further provides a method of injection molding a plastic product having a base wall and a sidewall, the method comprising the steps of:

(a) injecting fluid plastic material into a base-wall section of a mold cavity; and (b) conducting said injected plastic material through at least one flow guide in the base-wall section and thence into a sidewall section of the mold cavity;

wherein step (b) comprises the step of:

(c) conducting said injected plastic material through a sequence of variable-opening throttles in a given said at-least-one base-wall-section flow guide, wherein the openings of said throttles can vary in response to variations in the thickness of a region of the sidewall section into which injected plastic material is conducted from the given flow guide so that upon an increase in the thickness of said region the openings of said throttles in the given flow guide decrease and so that upon a decrease in the thickness of said region the openings of said throttles in the given flow guide increase;

wherein the mold parts include a cavity mold part, an adjustable mold part and a core mold part for shaping the mold cavity when the cavity mold part and the adjustable mold part are combined in opposition to the core mold part, with the cavity mold part shaping at least a portion of the sidewall section of the mold cavity and the adjustable mold part shaping at least a portion of the base-wall section of the mold cavity;

the method further comprising the step of:

(d) prior to commencement of a production run initializing the position of the adjustable mold part in relation to the cavity mold part to adjust the alignment between the adjustable mold part and the core mold part.

The present invention still further provides a method of injection molding a plastic product having a base wall and a sidewall, the method comprising the steps of:

(a) injecting fluid plastic material into a base-wall section of a mold cavity; and (b) conducting said injected plastic material through at least one flow guide in the base-wall section and thence into a sidewall section of the mold cavity;

wherein step (b) comprises the step of:

(c) conducting said injected plastic material through a sequence of variable-opening throttles in a given said at-least-one base-wall-section flow guide, wherein the openings of said throttles can vary in response to variations in the thickness of a region of the sidewall section into which injected plastic material is conducted from the given flow guide so that upon an increase in the thickness of said region the openings of said throttles in the given flow guide decrease and so that upon a decrease in the thickness of said region the openings of said throttles in the given flow guide increase;

wherein the mold parts include an adjustable cavity mold part and a core mold part for shaping at least a portion of the base-wall section of the mold cavity when the adjustable cavity mold part and the core mold part are combined in opposition to one another;

the method further comprising the step of:

(d) dynamically varying the position of the adjustable cavity mold part during a production run in response to sensed variations in injection pressures in different portions of the sidewall section of the mold cavity to adjust the alignment between the adjustable cavity mold part and the core mold part.

Additional features of the present invention are described with reference to the detailed description of the preferred embodiments.

BRIEF DESCRIPTION OF THE DRAWING

FIG. 2 is an end view of the mold cavity within the mold of FIG. 1, taken along line 2—2 in FIG. 1, and illustrating the approximate broad base-wall dimension aspect of the throttled flow guides shown in FIG. 1A.

FIGS. 3A and 3B viewed together illustrate variation in the openings of the sequence of throttles in the base-wall-section flow guide of FIG. 1A.

FIG. 10 is an end view of another alternative embodiment of a mold cavity that further contains concentric flow guides intersecting with radial throttled base-wall-section flow guides.

FIG. 11, which is taken along line 11—11 in FIG. 10, illustrates the sectional aspect of the sequence of variable-opening throttles in the individual base-wall-section flow guides in the embodiment of FIG. 10.

FIG. 12, which is taken along line 12—12 in FIG. 11, illustrates another sectional aspect of a variable-opening throttle in the embodiment of FIGS. 10 and 11.

DETAILED DESCRIPTION

Figure 1:
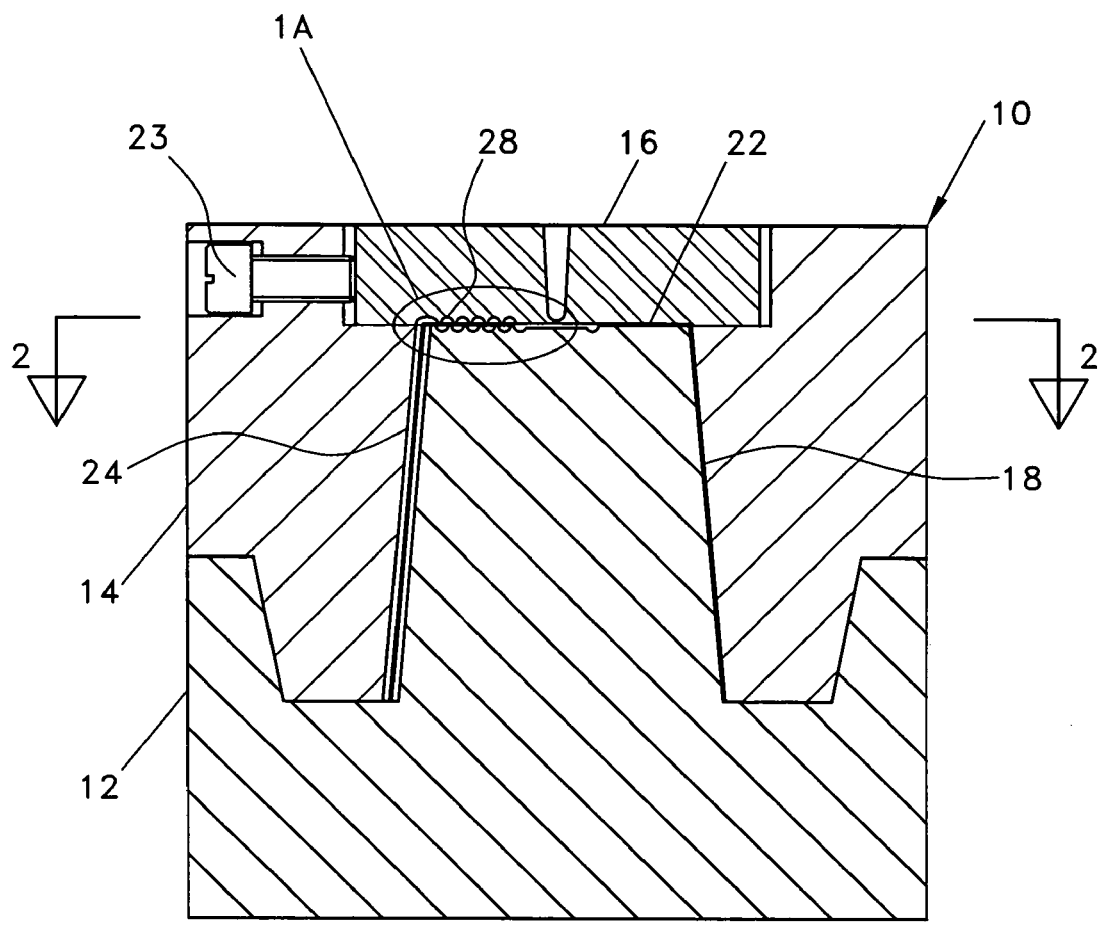
FIG. 1 is a sectional view of a preferred embodiment of a mold according to the present invention, taken along line 1—1 in FIG. 2.

Referring to FIG. 1, a preferred embodiment of the mold 10 includes a core mold part 12, a stationary cavity mold part 14 and an adjustable cavity mold part 16 for shaping a mold cavity 18 for forming a hollow symmetrical thin-wall plastic product, such as a drink cup, and a gate 20 from which fluid plastic material can be injected into a base-wall section 22 of the mold cavity 18 when the adjustable cavity mold part 16 and the core mold part 12 are combined in an aligned opposition to one another. At least three screws 23 are symmetrically disposed adjacent the side of the adjustable cavity mold part 16 for initializing the position of the adjustable cavity mold part 16 to adjust the alignment between the adjustable cavity mold part 16 and the core mold part 12.

In an alternative embodiment (not shown), the adjustable cavity mold part is attached to a symmetrical plurality of at least three pistons within a corresponding plurality of hydraulic cylinders for variable positioning of the adjustable cavity mold part in order to adjust the alignment between the adjustable cavity mold part and the core mold part. The position of the adjustable cavity mold part is initialized prior to commencement of a production run; and in some, but not all embodiments, (not shown) the position of the adjustable cavity mold part is also varied dynamically during a production run by varying the relative hydraulic fluid flows and/or pressures in the respective cylinders to further adjust the alignment between the adjustable cavity mold part and the core mold part in response to variations in injection pressures in different portions of the sidewall section of the mold cavity as sensed by a plurality of symmetrically disposed side mold pressure sensors. The variations of the relative hydraulic fluid flows and/or pressures in response to the sensed variations in the sidewall-section injection pressures are controlled by a computer.

In another alternative embodiment (not shown), the mold 10 does not include an adjustable cavity mold cavity part for shaping any portion of the base-wall section 22. In this alternative embodiment, the mold cavity is shaped by a combination of a core mold part and a stationary cavity mold part.

Figure 1A:
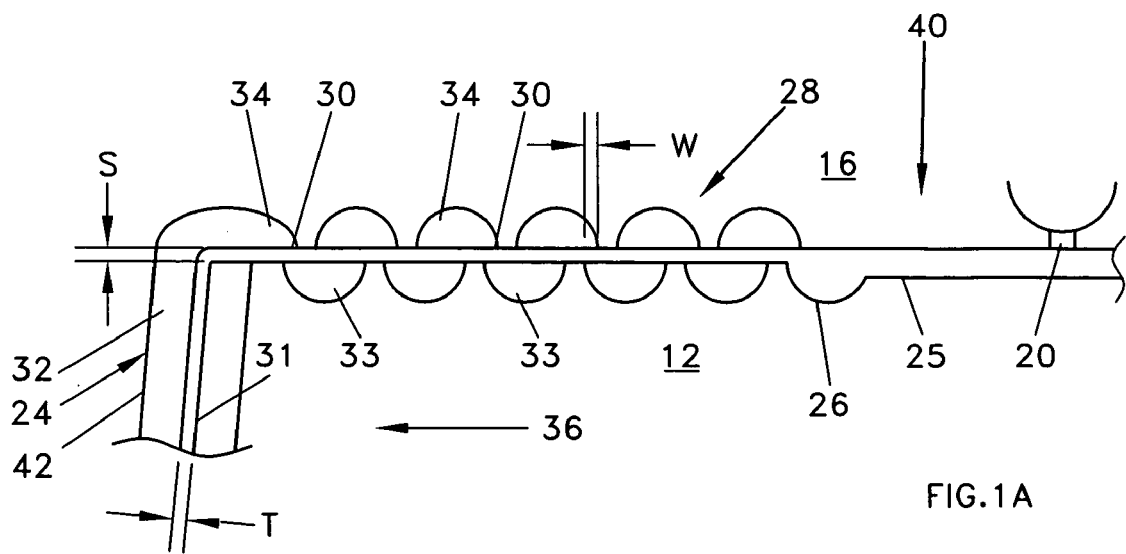
FIG. 1A is an enlarged view of encircled portion 1A of a mold cavity shown in FIG. 1, with said enlarged view illustrating the sectional aspect of a sequence of variable-opening throttles in a base-wall-section flow guide.

Referring to FIG. 1, a preferred embodiment of the mold 10 includes a core mold part 12, a stationary cavity mold part 14 and an adjustable cavity mold part 16 for shaping a mold cavity 18 for forming a hollow symmetrical thin-wall plastic product, Referring to FIGS. 1A and 2, the mold cavity 18 includes the base-wall section 22 and a sidewall section 24. The base-wall section 22 includes an inlet section 25 adjacent the gate 20, an inner circular flow guide 26 encircling the inlet section 25 and a plurality of radial flow guides 28 for conducting the injected plastic material from the inner circular flow guide 26, through the base-wall section 22 and thence into the sidewall section 24.

Each of the base-wall-section flow guides 28 includes a sequence of variable-opening throttles 30 through which the injected plastic material is conducted to the sidewall section 24. The sidewall section 24 includes a plurality of thin-wall sectors 31 and a plurality of flow guides 32 respectively extending from the plurality of throttled base-wall-section flow guides 28 for directing the flow of some of the injected plastic material to the thin-wall sectors 31 of the sidewall-section 24.

The throttles 30 are shaped by partially opposed recesses 33, 34 in the respective combined core mold part 12 and adjustable cavity mold part 16, with the opposed recesses 33, 34 being so staggered along the direction of conduction 36 within a given individual base-wall-section flow guide 28 that whenever the alignment between the combined core mold part 12 and the adjustable cavity mold part 16 varies along the direction of conduction 36 for the given flow guide 28 the openings of the throttles 30 in the given flow guide 28 vary. The recesses 33, 34 are circular in the approximate broad dimension of the base-wall section 22, as shown in FIG. 2.

The opening distance of an individual throttle 30 is equal to the square root of the sum of the square of the minimum width W of the stagger of the opposed recesses 33, 34 and the square of the separation S between the combined core mold part 12 and the adjustable cavity mold part 16 in the region of minimum stagger of the opposed recesses 33, 34. Preferably, in order to inhibit damage to the opposed core mold part 12 and adjustable cavity mold part 16 when the mold is compressed by a requisite clamping force, the shortest distance of separation within the mold cavity 18 in the direction of mold closure 40 when the mold is not clamped is larger than the elastic compression distance of the mold cavity 18 when the mold 10 is compressed by the requisite clamping force.

Referring to FIGS. 3A and 3B, the openings of the throttles 30 in a given base-wall-section flow guide 28 can vary in response to variations in the thickness of a region 42 of the sidewall section 24 into which the plastic material is conducted from the given base-wall-section flow guide 28 so that upon an increase in the thickness of the sidewall region 42, and thereby the thickness T of the adjacent sidewall sector 31, the openings of the throttles 30 in the given base-wall-section flow guide 28 decrease (FIG. 3A) and so that upon a decrease in the thickness of the sidewall region 42, and thereby the thickness T of the adjacent sidewall sector 31, the openings of the throttles 30 in the given base-wall-section flow guide 28 increase (FIG. 3B).

In an alternative embodiment (not shown) the mold cavity 18 further includes a plurality of radial base-wall section flow guides that extend to the sidewall section 24 for conducting fluid plastic material into the sidewall section 24 but do not include a sequence of variable-opening throttles; and the sidewall section 24 includes a plurality of flow guides 32 that extend from the non-throttled radial base-wall section flow guides for directing the flow of some of the injected plastic material to the thin-wall sectors 31 of the sidewall-section 24. The non-throttled radial base-wall section flow guides are interspersed symmetrically with the throttled radial base-wall section flow guides 28.

In alternative embodiments, the throttles shaped by the opposed recesses in the combined core mold part 12 and adjustable cavity mold part 16 have different configurations than the configuration shown in FIGS. 1A, 2, 3A and 31B.

Figure 4:
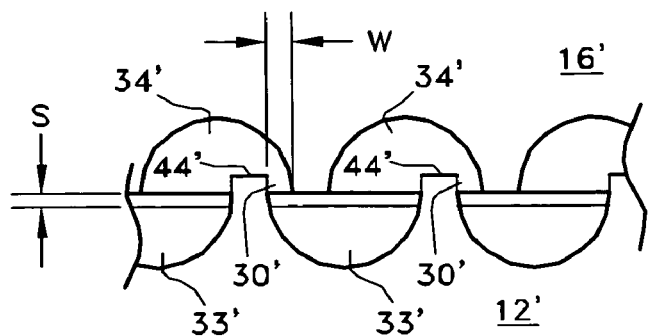
FIG. 4 illustrates one alternative embodiment of the sectional aspect of a sequence of variable-opening throttles in a base-wall-section flow guide.

Referring to FIG. 4, portions 44' of the core mold part 12' disposed between the recesses 33' extend into the recesses 34' within the adjustable cavity mold part 16' to thereby extend the length of the openings of the throttles 30' in contrast to the embodiment shown in FIG. 1A.

Figure 5:
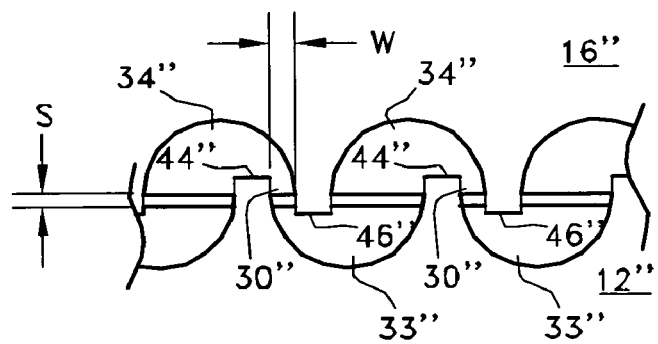
FIG. 5 illustrates another alternative embodiment of the sectional aspect of a sequence of variable-opening throttles in a base-wall-section flow guide.

Referring to FIG. 5, portions 44" of the core mold part 12" disposed between the recesses 33" extend into the recesses 34" within the adjustable cavity mold part 16" and portions 46" of the adjustable cavity mold part 16" disposed between the recesses 34" extend into the recesses 33" within the core mold part 12" to thereby further extend the length of the openings of the throttles 30" in contrast to the embodiments shown in FIGS. 1A and 4.

Figure 6:
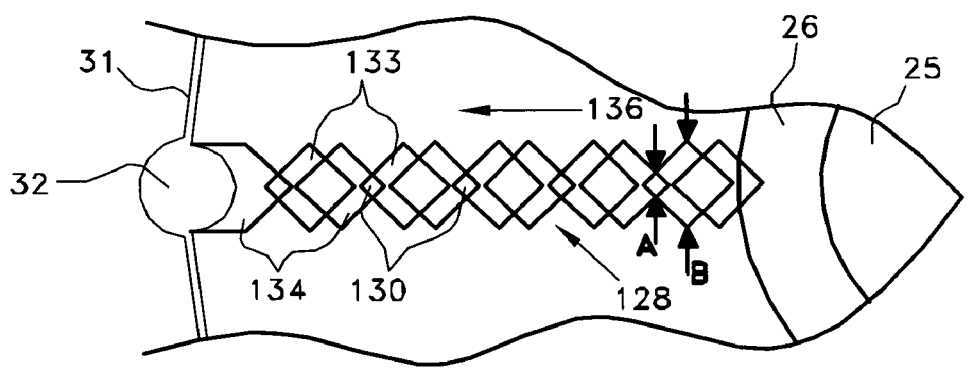
FIG. 6 illustrates one alternative embodiment of the broad base-wall section aspect of a sequence of variable-opening throttles in a base-wall-section flow guide.

Referring to FIG. 6, the recesses 133, 134 within the respective core mold part and adjustable cavity mold part are approximately rectangular in the approximate broad dimension of the base-wall section and are disposed with opposite corners of the rectangles aligned along the direction of conduction 136 within the flow guide 128 so that the corners of the recesses 133 within the core mold part are staggered with the corners of the recesses 134 within the adjustable cavity mold part to thereby shape the openings of the variable-opening throttles 130.

Figure 7:
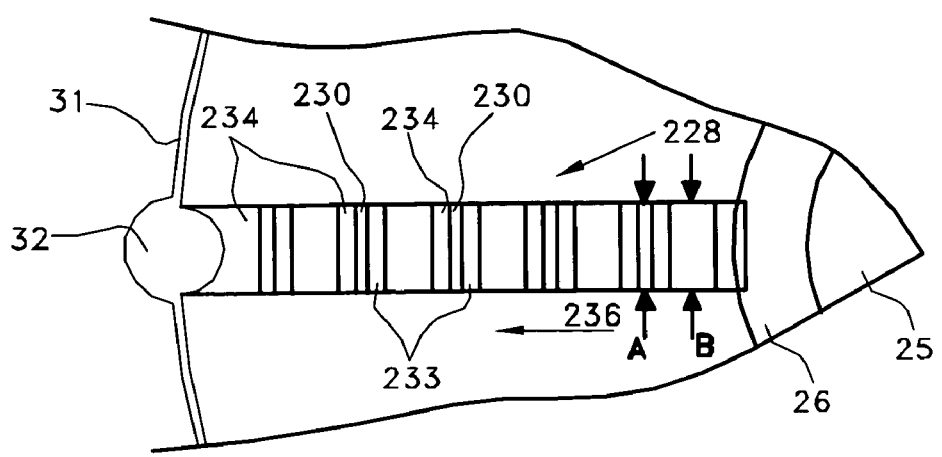
FIG. 7 illustrates another alternative embodiment of the broad base-wall section aspect of a sequence of variable-opening throttles in a base-wall-section flow guide.

Referring to FIG. 7, the recesses 233, 234 within the respective core mold part and adjustable cavity mold part are approximately rectangular in the approximate broad dimension of the base-wall section and are disposed with opposite sides of the rectangles aligned along the direction of conduction 236 within the flow guide 228 so that the sides of the recesses 233 within the core mold part are staggered with the sides of the recesses 234 within the adjustable cavity mold part to thereby shape the openings of the variable-opening throttles 230.

Figure 8:
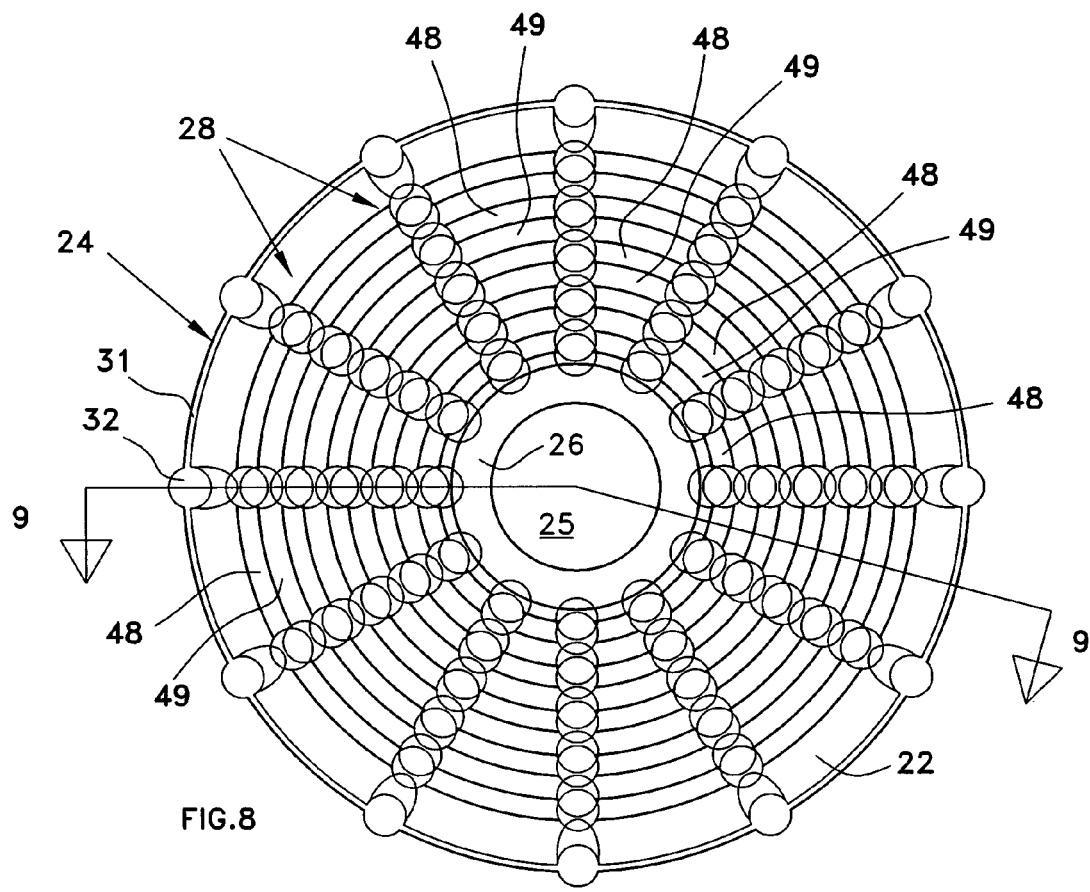
FIG. 8 is an end view of an alternative embodiment of a mold cavity that further contains concentric flow guides intersecting with radial throttled base-wall-section flow guides.
Figure 9:
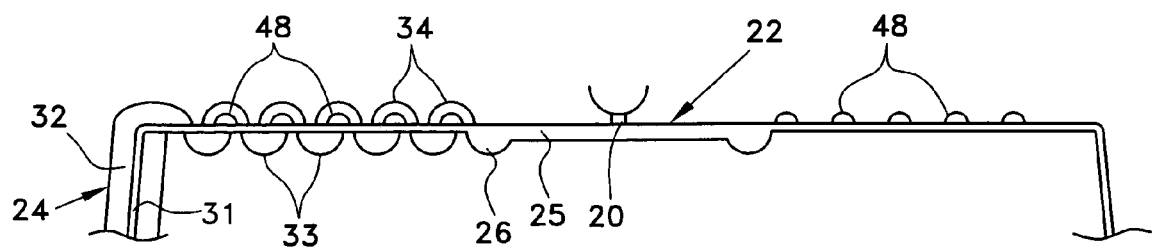
FIG. 9, which is taken along line 9—9 in FIG. 8, illustrates the sectional aspect of the sequence of variable-opening throttles in the individual base-wall-section flow guides in the embodiment of FIG. 8.

Referring to FIGS. 8 and 9, an alternative embodiment of the mold cavity 18 further contains a plurality of concentric flow guides 48 disposed between the inner circular flow guide 26 and the sidewall section 24. The concentric flow guides 48 intersect with the plurality of throttled radial base-wall-section flow guides 28. The concentric flow guides 48 inhibit the injected fluid plastic material from being conducted to the sidewall section 24 of the mold cavity 18 through the thin-wall sectors 49 of the base-wall section 22 that lie between the radial flow guides 28 and the concentric flow guides 48.

A preferred embodiment of the mold cavity 18 is shown in FIGS. 10, 11 and 12. The mold cavity 18 includes the base-wall section 50 and a sidewall section 52. The base-wall section 50 includes an inner circular flow guide 56, a plurality of inlet flow guides 58 extending from a gate to the inner circular flow guide 56, a plurality of throttled radial flow guides 60 and a plurality of concentric flow guides 62 disposed between the inner circular flow guide 56 and the sidewall section 52.

The throttled radial flow guides 60 conduct the injected plastic material from the inner circular flow guide 56, through the base-wall section 50 and thence into the sidewall section 52. The concentric flow guides 62 intersect with the plurality of throttled radial base-wall-section flow guides 60 and inhibit the injected fluid plastic material from being conducted to the sidewall section 52 of the mold cavity 18 through the thin-wall sectors 63 of the base-wall section 50 that lie between the radial flow guides 60.

Each of the radial base-wall-section flow guides 60 includes a sequence of variable-opening throttles 64 through which the injected plastic material is conducted to the sidewall section 52. The sidewall section 52 includes a plurality of thin-wall sectors 66 and a plurality of flow guides 68 respectively extending from the plurality of throttled base-wall-section flow guides 60 for directing the flow of some of the injected plastic material to the thin-wall sectors 66 of the sidewall-section 52.

The throttles 64 are shaped by partially opposed recesses 70, 72 in the respective combined core mold part 12 and adjustable cavity mold part 16, with the opposed recesses 70, 72 being so staggered along the direction of conduction 74 within a given individual radial base-wall-section flow guide 60 that whenever the alignment between the combined core mold part 12 and the adjustable cavity mold part 16 varies along the direction of conduction 74 for the given flow guide 60 the opening of the throttles 64 in the given flow guide 60 vary. The recesses 70, 72 are approximately rectangular in the approximate broad dimension of the base-wall section 50, as shown in FIG. 10, and are disposed with opposite sides of the rectangles aligned along the direction of conduction 74 within an individual flow guide 60 so that the sides of the recesses 70 within the core mold part are staggered with the sides of the recesses 72 within the adjustable cavity mold part to thereby shape the openings of the variable-opening throttles 64.

In the preferred embodiment of FIGS. 10, 11 and 12, the mold cavity 18 further includes chambers 80 adjacent the sidewall-section periphery of the base-wall section 50 at the junctures of the plastic material directed into the thin-wall cavity sectors 63 by the flow guides 60 adjacent the thin-wall cavity sectors 63 for forming ridges on the inside of the base wall of the injection-molded product to thereby enhance the stiffness of the base wall of the product.

Figure 13:
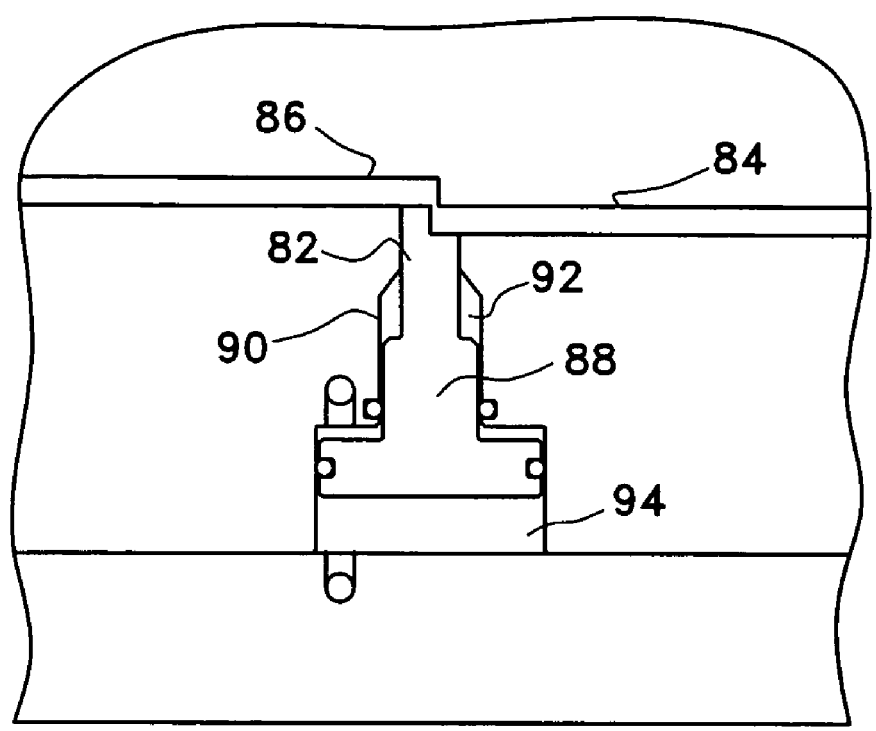
FIG. 13 is a side view of a flow guide in combination with a movable mold part for adjusting conduction within the flow guide.
Figure 14:
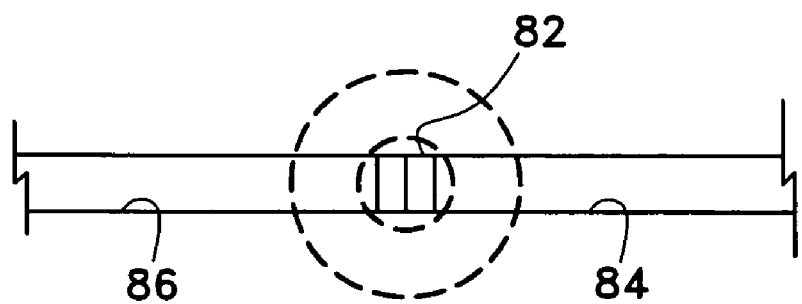
FIG. 14 is a top view of the flow guide of FIG. 13.

Referring to FIGS. 13 and 14 the alignment of the mold parts during injection is further enhanced in some, but not all, embodiments by utilization of a movable channel mold part 82 that is disposed in an introductory portion of one or more of the throttled radial flow guides between the inner circular flow guide and the beginning of the sequence of throttles. When the movable channel mold part 82 is so utilized the introductory portion of the throttled flow guide includes a first segment 84 and a second segment 86 that is misaligned with the first segment 84 but that overlaps the first segment 84 to enable conduction of fluid plastic material from the first segment 84 to the second segment 86. The movable channel mold part 82 is disposed at the segment overlap to decrease the conduction from the first segment 84 to the second segment 86 when the movable channel mold part 82 is protracted and to increase such conduction when the movable channel mold part 82 is retracted, to thereby adjust the conduction of fluid plastic material within the flow guide.

The movable channel mold part 82 is attached to a piston 88 within a hydraulic cylinder 90 for protraction and retraction in response to relative hydraulic fluid flows and/or pressures within the front and back portions 92, 94 of the cylinder 90. The movable channel mold part 82 is protracted or retracted to an initial position prior to commencement of a production run. In some, but not all embodiments, (not shown) the movable channel mold part 82 is also protracted and/or retracted dynamically during a production run by varying the relative hydraulic fluid flows and/or pressures within the cylinder 90 in response to variations in injection pressures in different portions of the sidewall section 24 of the mold cavity 18 as sensed by a plurality of symmetrically disposed side mold pressure sensors. The variations of the relative hydraulic fluid flows and/or pressures in response to the sensed variations in the sidewall-section injection pressures are controlled by a computer.

In another alternative embodiment (not shown), in which it is not desired to dynamically protract and/or retract the movable channel mold part 82 during a production run, a hydraulic-cylinder is not used. Instead a screw is connected to the movable channel mold part 82 for protracting or retracting the movable channel mold part to an initial position prior to commencement of a production run.

The movable channel mold part and flow guide combination of FIGS. 13 and 14 is also useful for adjusting fluid plastic material conduction within non-throttled flow guides in injection molding embodiments unrelated to alignment of mold parts.

Additional embodiments of the present invention (not shown) include all different combinations of the features described herein for adjusting flow of injected plastic material and/or aligning mold parts to shape products that are not necessarily hollow or symmetrical.

The advantages specifically stated herein do not necessarily apply to every conceivable embodiment of the present invention. Further, such stated advantages of the present invention are only examples and should not be construed as the only advantages of the present invention. While the above description contains many specificities, these should not be construed as being necessarily required for use of the present invention or as limitations on the scope of the present invention, but rather as examples of the embodiments described herein. Other variations are possible and the scope of the present invention should be determined not by the embodiments described herein but rather by the claims and their legal equivalents.

The invention claimed is:

1. A method of injection molding a plastic product having a base wall and a sidewall, the method comprising the steps of:
   (a) injecting fluid plastic material into a base-wall section of a mold cavity wherein the base-wall section includes at least one flow guide that is defined by a first mold part, a second mold part, and a third mold part that is movable relative to the first and second mold parts to either decrease or increase the conduction of injected plastic material through said at least one flow guide;
   (b) conducting said injected plastic material through said at least one flow guide in the base-wall section and thence into a sidewall section of the mold cavity; and
   (c) while said injected plastic material is being conducted into the sidewall section of the mold cavity, adjusting said conduction within the at-least-one base-wall section flow guide by moving the movable third mold part to decrease and/or increase said conduction of said plastic material within said flow guide;
   wherein step (c) comprises moving the movable third mold part dynamically in response to sensed variations in injection pressures in different portions of the sidewall section of the mold cavity.

2. A method according to claim 1, wherein in an introductory portion of the at-least-one base-wall section flow guide between an injection gate and the beginning of a sequence of variable opening throttles, the at-least-one base-wall section flow guide includes a first segment and a second segment that is misaligned with the first segment but that overlaps the first segment to enable conduction of fluid plastic material from the first segment to the second segment;
   wherein said overlap is defined by the first mold part, the second mold part, and the third movable mold part, with the movable third mold part being protractible into and retractable from said overlap to either decrease or increase the conduction of injected plastic material through said overlap; and wherein step (c) includes protracting the movable mold part to decrease said conduction from the first segment to the second segment by decreasing said overlap and/or retracting the movable mold part to increase said conduction from the first segment to the second segment by increasing said overlap.

3. A method according to claim 1, further comprising the step of:

(d) sensing said variations in injection pressures by using a plurality of symmetrically disposed side mold pressure sensors.

4. A method according to claim 1, further comprising the step of:

(d) prior to commencement of a production run, moving the movable third mold part to initialize the position of the movable third mold part in relation to the first and second mold parts in order to adjust said conduction within the at-least-one base-wall.

5. A method of injection molding a plastic product having a base wall and a sidewall, the method comprising the steps of:

(a) injecting fluid plastic material into a base-wall section of a mold cavity wherein the base-wall section includes at least one flow guide that is defined by a first mold part, a second mold part, and a third mold part that is movable relative to the first and second mold parts to either decrease or increase the conduction of injected plastic material through said at least one flow guide; and (b) conducting said injected plastic material through said at least one flow guide in the base-wall section and thence into a sidewall section of the mold cavity;

wherein step (b) comprises the step of:

(c) conducting said injected plastic material through a sequence of variable-opening throttles in a given said at-least-one base-wall-section flow guide, wherein the openings of said throttles can vary in response to variations in the thickness of a region of the sidewall section into which injected plastic material is conducted from the given flow guide so that upon an increase in the thickness of said region the openings of said throttles in the given flow guide decrease and so that upon a decrease in the thickness of said region the openings of said throttles in the given flow guide increase;

the method further comprising the step of:

(d) while said injected plastic material is being conducted into the sidewall section of the mold cavity, adjusting said conduction within the at-least-one base-wall section flow guide by moving the movable third mold part to decrease and/or increase said conduction of said plastic material within said flow guide;

wherein step (d) comprises moving the movable third mold part dynamically in response to sensed variations in injection pressures in different portions of the sidewall section of the mold cavity.

6. A method according to claim 5, further comprising the step of:

(e) sensing said variations in injection pressures by using a plurality of symmetrically disposed side mold pressure sensors.

7. A method of injection molding a plastic product having a base wall and a sidewall, the method comprising the steps of:

(a) injecting fluid plastic material into a base-wall section of a mold cavity; and (b) conducting said injected plastic material through at least one flow guide in the base-wall section and thence into a sidewall section of the mold cavity;

wherein step (b) comprises the step of:

(c) conducting said injected plastic material through a sequence of variable-opening throttles in a given said at-least-one base-wall-section flow guide, wherein the openings of said throttles can vary in response to variations in the thickness of a region of the sidewall section into which injected plastic material is conducted from the given flow guide so that upon an increase in the thickness of said region the openings of said throttles in the given flow guide decrease and so that upon a decrease in the thickness of said region the openings of said throttles in the given flow guide increase;

wherein the mold parts include a cavity mold part, an adjustable mold part and a core mold part for shaping the mold cavity when the cavity mold part and the adjustable mold part are combined in opposition to the core mold part, with the cavity mold part shaping at least a portion of the sidewall section of the mold cavity and the adjustable mold part shaping at least a portion of the base-wall section of the mold cavity;

the method further comprising the step of:

(d) prior to commencement of a production run initializing the position of the adjustable mold part in relation to the cavity mold part to adjust the alignment between the adjustable mold part and the core mold part.

8. A method according to claim 7, further comprising the step of:

(e) dynamically varying the position of the adjustable mold part during a production run in response to sensed variations in injection pressures in different portions of the sidewall section of the mold cavity to further adjust the alignment between the adjustable mold part and the core mold part.

9. A method of injection molding a plastic product having a base wall and a sidewall, the method comprising the steps of:

(a) injecting fluid plastic material into a base-wall section of a mold cavity; and (b) conducting said injected plastic material through at least one flow guide in the base-wall section and thence into a sidewall section of the mold cavity;

wherein step (b) comprises the step of:

(c) conducting said injected plastic material through a sequence of variable-opening throttles in a given said at-least-one base-wall-section flow guide, wherein the openings of said throttles can vary in response to variations in the thickness of a region of the sidewall section into which injected plastic material is conducted from the given flow guide so that upon an increase in the thickness of said region the openings of said throttles in the given flow guide decrease and so that upon a decrease in the thickness of said region the openings of said throttles in the given flow guide increase;

wherein the mold parts include an adjustable cavity mold part and a core mold part for shaping at least a portion of the base-wall section of the mold cavity when the adjustable cavity mold part and the core mold part are combined in opposition to one another;

the method further comprising the step of:

(d) dynamically varying the position of the adjustable cavity mold part during a production run in response to sensed variations in injection pressures in different portions of the sidewall section of the mold cavity to adjust the alignment between the adjustable cavity mold part and the core mold part.

10. A method according to claim 9, further comprising the step of:

(e) sensing said variations in injection pressures by using a plurality of symmetrically disposed side mold pressure sensors.

* * * * *